United States Patent [19]
Wixson

[11] Patent Number: 5,963,272
[45] Date of Patent: Oct. 5, 1999

[54] METHOD AND APPARATUS FOR GENERATING A REFERENCE IMAGE FROM AN IMAGE SEQUENCE

[75] Inventor: Lambert Ernest Wixson, Rocky Hill, N.J.

[73] Assignee: Sarnoff Corporation, Princeton, N.J.

[21] Appl. No.: 08/742,434

[22] Filed: Oct. 30, 1996

Related U.S. Application Data

[60] Provisional application No. 60/006,104, Oct. 31, 1995.

[51] Int. Cl.$^6$ ..................................................... H04N 5/14
[52] U.S. Cl. ........................................ 348/700; 348/149
[58] Field of Search ............................. 348/17–19, 402, 348/407, 413, 416, 699–701, 143, 148, 149; 382/190, 217–219, 232, 238, 242; H04N 5/14

[56] References Cited

U.S. PATENT DOCUMENTS

| | | | |
|---|---|---|---|
| 5,339,104 | 8/1994 | Hong | 348/155 |
| 5,400,087 | 3/1995 | Uramoto et al. | 348/699 |
| 5,537,155 | 7/1996 | O'Connell et al. | 348/699 |
| 5,546,129 | 8/1996 | Lee | 348/416 |
| 5,579,401 | 11/1996 | Gear | 382/100 |
| 5,581,308 | 12/1996 | Lee | 348/699 |
| 5,581,309 | 12/1996 | Okino et al. | 348/699 |
| 5,606,376 | 2/1997 | Shinohara | 348/701 |
| 5,627,915 | 5/1997 | Rosser et al. | 382/219 |
| 5,847,755 | 12/1998 | Wixson et al. | 348/149 |

OTHER PUBLICATIONS

M. Kilger, "A Shadow Handler in a Video–Based Real–time Traffic Monitoring System", IEEE Workshop on Application of Computer Vision, pp. 11–18, 1992.

D. Koller, J. Weber, J. Malik, "Robust Multiple Car Tracking with Occlusion Reasoning", European Conference on Computer Vision, 1994, pp. 189–196.

*Primary Examiner*—Richard Lee
*Attorney, Agent, or Firm*—William J. Burke

[57] ABSTRACT

A locally-adaptive method and apparatus for constructing a reference image containing only the background from an image sequence containing moving or temporarily-stationary objects. Specifically, the apparatus contains a sample mask selector and a reference updater. The selector generates a mask which is used by the updated to perform updating of a reference image using only portions of the input image that contain background imagery. The updater enhances the masking function using a statistical analysis to avoid updating pixels using non-background imagery.

7 Claims, 4 Drawing Sheets

METHOD AND APPARATUS FOR GENERATING A REFERENCE IMAGE FROM AN IMAGE SEQUENCE

This patent application claims benefit of U.S. provisional patent application Ser. No. 60/006,104 filed Oct. 31, 1995.

The invention relates to image processing systems and, more particularly, to a method and apparatus for generating a reference image from a sequence of images.

BACKGROUND OF THE DISCLOSURE

Many computer vision systems for automatic surveillance and monitoring seek to detect and segment transitory objects that appear temporarily in the system's field of view. Examples include traffic monitoring applications that count vehicles and automatic surveillance systems for security. An example of such a system is disclosed in U.S. patent application Ser. No. 08/372,924 filed Jan. 17, 1995, the disclosure of which is incorporated herein by reference.

Given an image sequence obtained from a mostly stationary camera, these systems typically use a reference image of the scene of interest containing only the static objects in the scene and none of the moving objects. The system then determines the changes in the scene by comparing a "present" image with the reference image. Such a reference image is useful in many applications where it is necessary to delineate individual objects that appear in the scene only briefly or that do not belong in the scene. Two such applications are security surveillance and traffic monitoring.

The problem of constructing a reference image is easy in theory but difficult in practice. One would like such an image to adapt quickly to illumination changes such as those created by a passing cloud or lengthening shadows due to movement of the sun. On the other hand, the image should adjust slowly enough to avoid incorporating objects that are temporarily stopped, such as vehicles which are waiting at an intersection or stuck in a traffic jam.

The obvious method for constructing a reference image is to update the image using a recursive temporal filter, as in $$r_t(x,y) = r_{t-1}(x,y) + \gamma \times [i_t(x,y) - r_{t-1}(x,y)]$$

where $r_t$ represents the reference image after frame t, and $i_t$ represents the t'th frame of the input sequence. The constant $\gamma$ determines the "responsiveness" of the construction process.

Unfortunately, there is no single value of $\gamma$ that will adjust $r_t$ quickly enough to add illumination changes to the reference image but slowly enough to keep temporarily-stopped objects out of the reference image. Furthermore, a $\gamma$ that slows updating sufficiently that temporarily-stopped vehicles will not be incorporated into the reference will prevent rapid initial construction of the reference image at system startup.

A second problem with using a simple temporal filter as described above is that the filter is global in nature and applies to the entire image. In some cases it is desirable to update different regions of the image at different times. A good example is a camera which overlooks two different lanes of traffic. Sometimes the traffic in one of these lanes may be flowing freely, which is a favorable condition to use the temporal filter, while the other lane may contain stopped traffic, where such a filter may incorporate the stopped traffic into the reference image.

Therefore, a need exists in the art for an improved method and apparatus for generating and updating a reference image for use in an image processing system.

SUMMARY OF THE INVENTION

The invention is a locally-adaptive method and apparatus for generating a reference image containing only the background from an image sequence of a scene that contains moving or temporarily-stationary objects. Specifically, the invention contains a sample mask selector and a reference updater. The selector generates a mask which is used by the updater to update a reference image using only portions of the input image that contain background imagery. The updater enhances the masking function using a statistical analysis to avoid updating pixels using non-background imagery.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention is a method and apparatus for generating and updating a reference image locally rather than globally. In other words, different regions of the image can be updated at different times. A binary "sample mask" image is used to specify which pixels can be updated at each frame. This sample mask is computed based on image differences over time, and is thus related to the presence of image motion. The invention performs reference image updating (i.e., set the sample mask to 1) only in image locations that are likely to contain background information.

Figure 1:
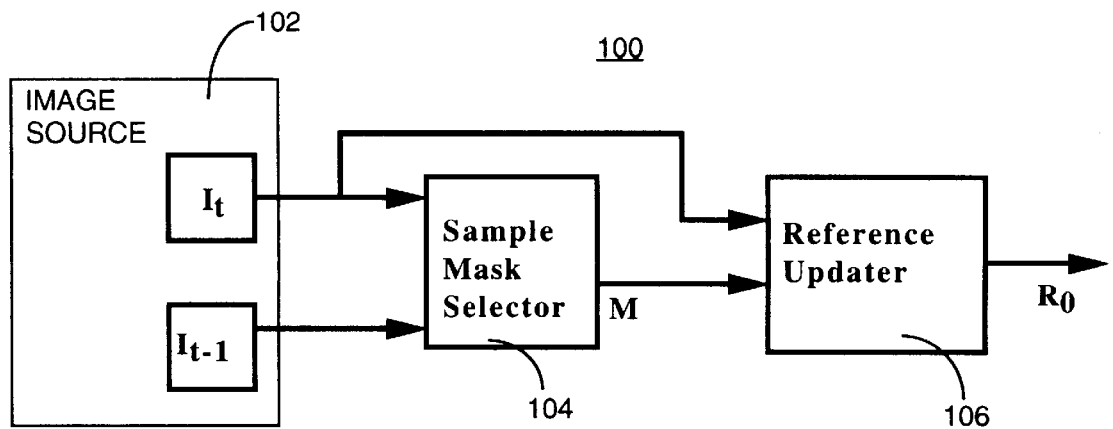
FIG. 1 is a block diagram of apparatus for generating a reference image in accordance with the present invention.

FIG. 1 depicts an illustrative embodiment of the invention. Specifically, apparatus 100 contains a sample mask selector 104 and a reference updater 106. The apparatus 100 is coupled to an image source 102 such as a video camera or other sensor that provides a sequence of images ($I_t$) to the apparatus for processing. The sample mask selector selects a mask that facilitates selective updating of a reference image with the content of the latest image ($I_t$). The mask is selected based upon the content of the latest image ($I_t$) and the previous image ($I_{t-1}$). The selected mask is coupled to the reference updater 106 that updates the reference image using the latest image ($I_t$). The updated reference image is $R_0$.

To effectively produce a mask, the apparatus must determine which image locations are likely to contain background and hence should be set to 1 in a sample mask. Such locations can be identified by checking whether they have recently contained image motion but currently contain no motion. This is taken as an indication that a moving object has recently passed through that image location, and therefore, the current image value at that image location is probably a true reading of the background.

Using the condition of recent image motion to select the sample mask prevents pixel values at image locations containing temporarily-stopped objects from being incorporated into the reference image, even if the objects remain stationary for relatively long periods of time. An example where this method is useful in processing imagery is a camera overlooking an intersection at a traffic light. Image locations overlooking traffic lanes in which vehicles are moving are updated in the reference image, while image locations overlooking lanes where vehicles are waiting for the traffic light and therefore stationary are not updated until traffic begins to flow.

Although this method of sample mask selection is good, it is not perfect. At the instant when an object comes to a stop in the field of view, the image locations of the object will be selected for the sample mask. This happens because they meet the requirement of recent movement followed by no movement. This can lead to "false" samples being selected in the sample mask. At intersections containing stop-and-go traffic, the number of these false samples can be significant. Therefore, the method for updating the reference image based on the sample mask is non-trivial. This invention uses statistical measures to decide upon the "true" value of the reference image at each point even in the presence of false samples.

Figure 2:
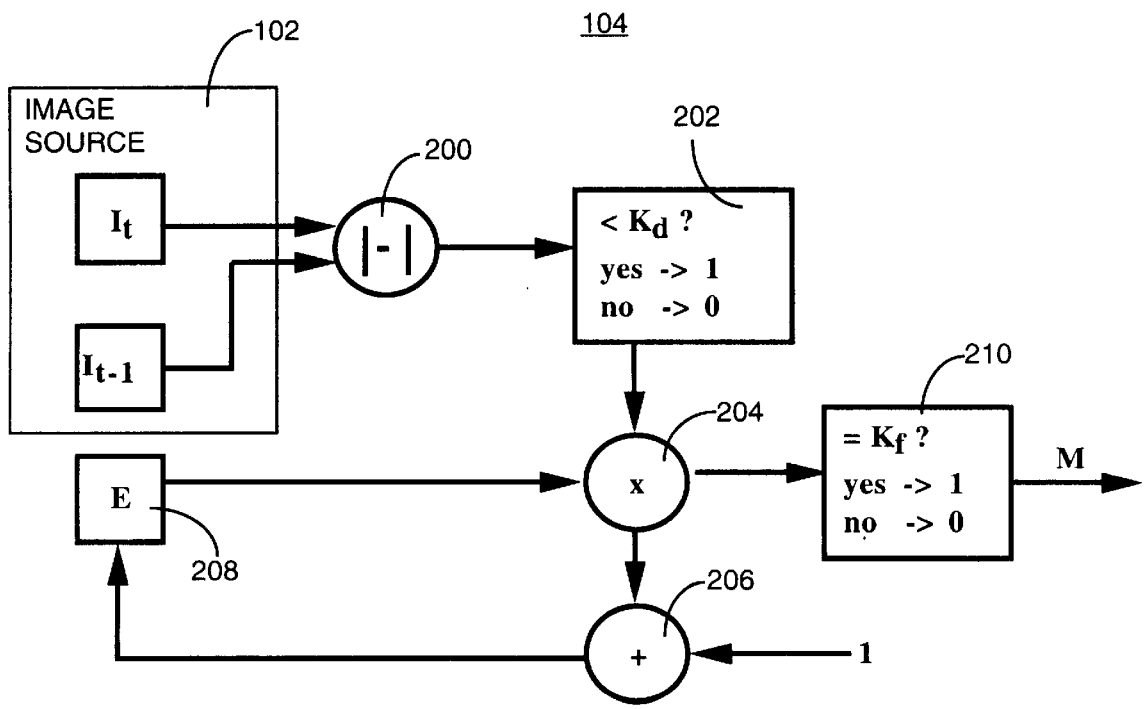
FIG. 2 is a block diagram of the sample mask selector of FIG. 1.

FIG. 2 depicts a block diagram of the sample mask selector 104. The sample mask generator contains a subtractor 200, first decision block 202, multiplier 204, adder 206, image storage 208, and second decision block 210. The sample mask selector 104 takes as input two images, the current frame $I_t$ and the previous frame $I_{t-1}$. It also maintains, in storage 208, a third image E which stores for each pixel, the number of frames since there was a significant difference at that pixel. In the disclosed implementation the difference measure used is the absolute difference between the pixel value in $I_t$ and $I_{t-1}$, though any difference measure could be used. In particular, subtractor 200 subtracts the current image ($I_t$) from the previous image ($I_{t-1}$) to produce the difference measure. The difference measure is coupled to first decision block 202 wherein, if the difference measure is less than a constant $K_d$, the output is 1 and if larger than $K_d$, the output is 0. The value of $K_d$ is a measure of "significant change." The output is coupled to one input of multiplier 204. The second input of the multiplier is coupled to the storage 208. As such, the multiplier combines the image E with the binary values of the decision block 202. The output of the multiplier is coupled to one input of adder 206. The second input of the adder is a constant (e.g., 1). The output of the adder is stored in storage 208. The output of the multiplier 204 is also coupled to the second decision block 210. When this value from the multiplier 204 is equal to exactly $K_f$ frames, the sample mask at that pixel is set to 1; otherwise, the mask value is zero. This ensures that the sample mask for a pixel will not be set to 1 until change has stopped occurring at that pixel. Further, the sample mask for a pixel will only be set to 1 once per significant change at that pixel.

Figure 3:
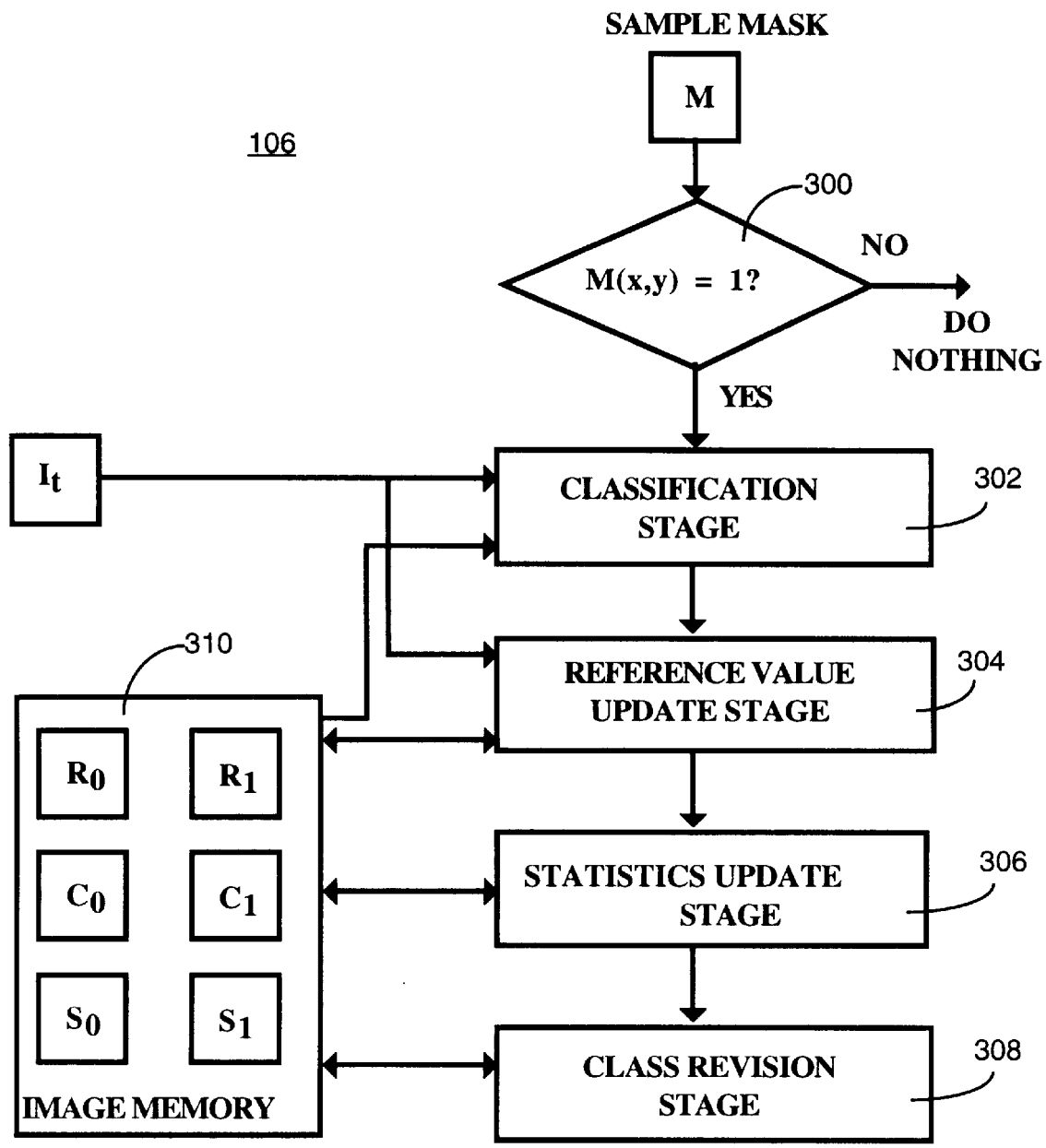
FIG. 3 is a block diagram of reference updater of FIG. 1.

FIG. 3 depicts a block diagram of the reference updater 106. The reference updater 106 contains a plurality of sequential stages including a decision block 300, a classification stage 302, a reference value update stage 304, a statistics stage 306, a class revision stage 308 and an image memory 310. Each stage is utilized sequentially and all stages are connected to the memory 310.

The reference updater is responsible for maintaining the reference image. Upon receiving each image ($I_t$), the updater tries to update the reference image only at those locations that are 1 in the sample mask image M. As such, for each pixel to be processed, the mask is compared to threshold using decision block 300. If the query is negatively answered, the updater is exited without changing that pixel in the reference image. However, if the query is affirmatively answered, the updater proceeds to update the reference image. The sample mask image is designed to contain 1 at those locations where there is a significant likelihood that the background is being imaged (i.e., locations where change was seen recently but has not been seen since). However, using the mask is not perfect; false positives can occur in the sample mask, especially when objects stop in the field of view for a significant period of time. Therefore, the reference updater 106 applies statistical measures to determine the true background value despite these occasional false positive samples. To do so, the reference updater maintains two possible reference "classes", 0 and 1. Associated with each is a reference image, called $R_0$ and $R_1$. The image $R_0$ is taken to be the true reference, while the $R_1$ image can be thought of as the potential reference image. When the statistical "coherence" of an image location in $R_1$ becomes stronger than the "coherence" of the sample location in $R_0$, then an $R_1$ pixel value is placed into the $R_0$ image, while the $R_0$ pixel value is moved into the $R_1$ image.

The reference updater maintains four additional images besides $R_0$ and $R_1$ in order to measure this statistical coherence. These are $C_0$, $C_1$, $S_0$, and $S_1$ which are stored in memory 310. Image $S_0$ stores, for each image location, the total number of samples that have been obtained at that location since the reference value for class 0 was reset. Image $C_0$ stores, for each image location, the number of samples counted in $S_0$ that have been classed as belonging to reference class 0, since the reference value for class 0 was reset. Images $C_1$ and $S_1$ are similar to $C_0$ and $S_0$, but contain measurements with respect to class 1 rather than class 0. For each class k∈{0,1}, images $C_k$ and $S_k$ can be used to measure the "coherence" of the reference value stored in $R_k$ at each point (x,y) by examining the measure $$C_k(x, y)/S_k(x, y).$$

This measure will be large when most of the samples that have been obtained at (x,y) have fallen into class k.

More specifically, the classification stage 302 classifies the sample as belonging to either class 0, class 1, or neither. This classification is used by the reference value update stage 304 to update the reference image associated with the class. The statistics update stage 306 then checks each class to see if the number of samples in that class should be re-scaled or if the class's reference value has poor coherence and should be reset. Finally, the class revision stage 308 checks to see whether class 1 has better coherence than class 0 and hence should be swapped with class 0 at this pixel location.

Figure 4:
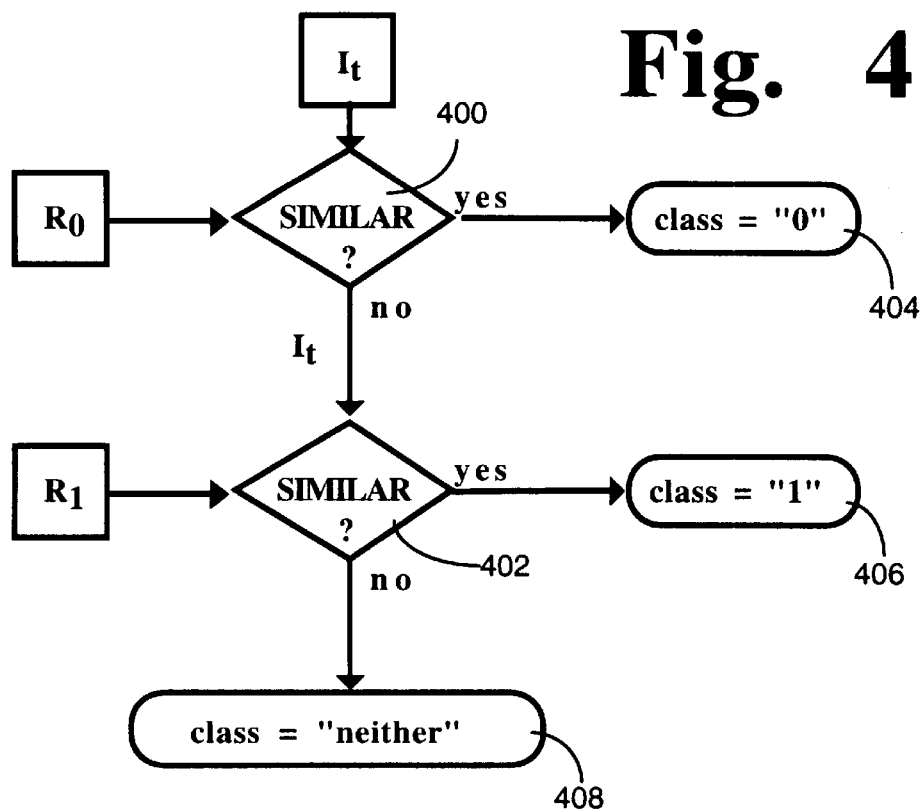
FIG. 4 is a flow diagram of the classifier routine.

The classification stage 302 operates as depicted in the flow diagram of FIG. 4. The stage compares, at steps 400 and 402, the pixel value in the current image $I_t$ with the corresponding values in the reference images $R_0$ and $R_1$. If the current image's pixel value is similar to the value in $R_0$, the pixel is classified as belonging to class 0 404. If not, and the pixel value is similar to that of $R_1$, the pixel is classified as belonging to class 1 406. If the value is similar to neither that of $R_0$ or $R_1$, it is classified as "neither" 408. Similarity is determined using standard difference metrics (e.g. squared or absolute difference) applied to the pixel values and/or functions of the pixel values such as image energy.

The reference value update stage 304 of FIG. 3 performs the following routine at each pixel (x,y):

1. Increment $S_0(x,y)$.
2. Increment $S_1(x,y)$.
3. If location (x,y) has been classified in the previous stage as class z, where $Z\epsilon\{0,1\}$, then:
   a. Increment $C_z(x,y)$.
   b. $R_z(x,y):=R_z(x,y)+\alpha(I_t(x,y)-R_z(x,y))$.

Steps 1 and 2 increment the record of the number of samples obtained at the location for both classes. Step 3 updates measures specific to the class into which (x,y) was determined to belong (as long as that class was not "neither"). Step 3a updates the number of samples which have been classified as class z. Step 3b updates the reference value for class z to bring it closer to $I_t(x,y)$. The symbol $\alpha$ represents a constant between 0 and 1 that controls the rate of this update.

Figure 5:
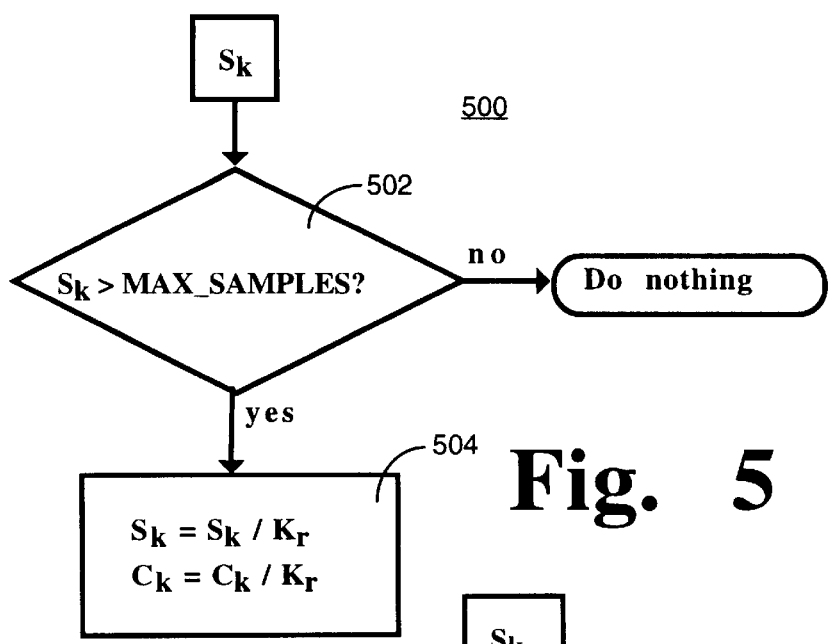
FIG. 5 is a flow diagram of a routine that updates the statistics used by the reference updater.
Figure 6:
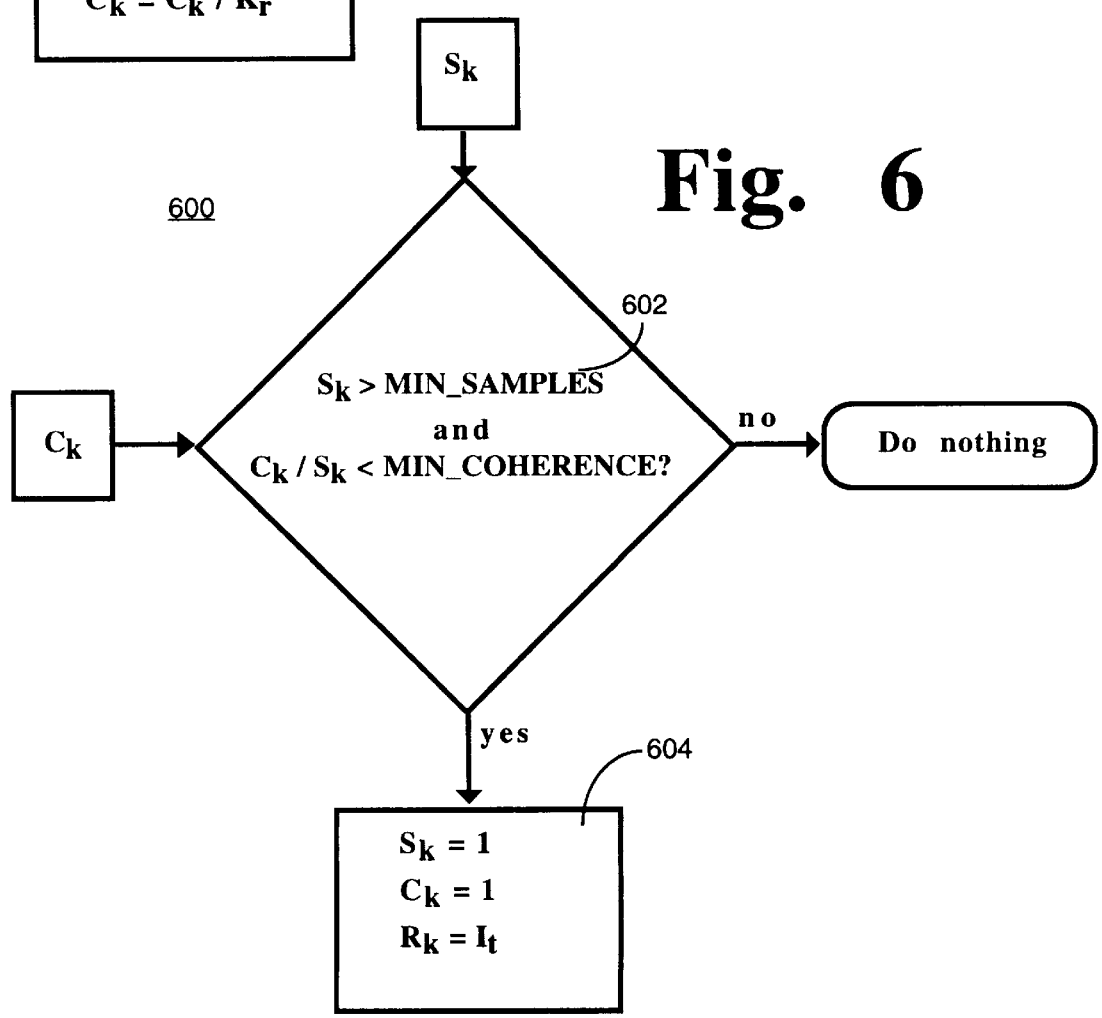
FIG. 6 is a flow diagram of a class revision routine executed by the reference updater.

The next stage of the reference updater is the statistics update stage. The Statistics Update stage 306 of FIG. 3 performs two processes shown in FIGS. 5 and 6 to each pixel location for both classes $k\epsilon\{0,1\}$. The first process 500 examines, at step 502, the total number of samples that have been obtained, stored in $S_k$. When this exceeds some threshold (denoted by MAX_SAMPLES), the $C_k$ and $S_k$ counts are scaled downwards, at step 504, by a constant $K_r$. The purpose of this is to ensure that the $C_k$ and $S_k$ counts reflect relatively recent samples, rather than samples obtained a long time ago. The second process 600 measures, at step 602, the coherence of class k and compares it to a constant threshold MIN_COHERENCE. If the coherence is less than this threshold, this is taken as an indication that the value in the reference image $R_k$ is not accounting well for the samples and should therefore be reset. This is accomplished, at step 604, by copying the value in the current image into $R_k$ and resetting $C_k$ and $S_k$ to 1.

Figure 7:
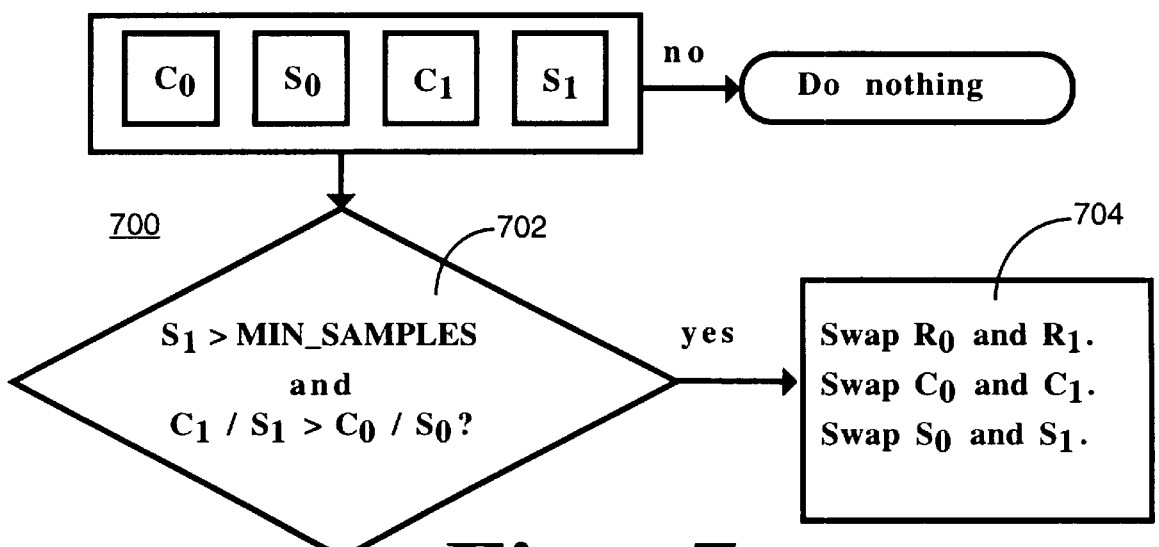
FIG. 7 is a flow diagram of the operation of stage 308.

The final stage of the reference updater is the class revision stage 308 of FIG. 3. The flow diagram of the operation of stage 308 is shown in FIG. 7. At each pixel location, this stage tests, at step 702, the coherence of class 1 against that of class 0. Recall that class 0 is supposed to be the "true" reference value while class 1 is supposed to represent a potential value. If the coherence of class 1 is greater than that of class 0, then the values are swapped at that pixel location in step 704.

The input images $I_t$ and $I_{t-1}$ need not be restricted to the raw unprocessed images obtained from a digitizer. They may also be filtered, integrated, and/or subsampled versions of the digitized imagery. For example, the inventive method can be used to process one dimensional (1D) images obtained by integrating elongated regions of the input two dimensional (2D) imagery into a single dimension. The difference and similarity measures used in the sample mask selector and the classification stage may be any function of $I_t$ and $I_{t-1}$ and/or filtered versions thereof. The motion-based reference image updating method described herein may be coupled with a slow-running time-averaging to make the method more adaptive to changing light levels in scenes with little movement. Additionally, in situations where external information about the likely presence of movement is available, the reference image updating can be turned on or off as appropriate. For example, consider scenes obtained from a camera that is monitoring traffic at an intersection that is controlled by a traffic light. Traffic lanes with green lights are likely to contain object movement and hence are good locations to obtain samples of the true background. On the other hand, lanes that have a red light are a potential source of false samples which will be generated by vehicles coming to a stop. If the system has an input that indicates the status of the traffic light, this can be used to activate/deactivate reference image updating in appropriate image locations.

It is to be understood that the apparatus and method of operation taught herein are illustrative of the invention. Modifications may readily be devised by those skilled in the art without departing from the spirit or scope of the invention. The invention can be used in any system where a reference image is useful, such as surveillance, traffic monitoring, change detection and monitoring.

What is claimed is:

1. Apparatus for generating and updating a reference image from a sequence of images representing a scene comprising:
    a sample mask selector for generating, in response to a first image and a second image in said sequence of images, a sample mask for controlling reference image generation; and
    a reference updater for updating select portions of a reference image in response to said first image and said sample mask, where said sample mask defines the portions of said reference image to be updated.

2. The apparatus of claim 1 wherein said sample mask permits the reference image to be updated with information in said first image at locations containing background information of said scene.

3. A method of generating and updating a reference image from a sequence of images representing a scene comprising the steps of:
    generating, in response to a first image and a second image in said sequence of images, a sample mask for controlling reference image generation; and
    updating select portions of a reference image in response to said first image and said sample mask, where said sample mask defines the portions of said reference image to be updated.

4. The method of claim 3 wherein said sample mask permits the reference image to be updated with information in said first image at locations containing background information of said scene.

5. The method of claim 3 wherein said generating step further comprises the step of detecting locations in said sequence of images having changes followed by no change over a predefined duration.

6. The method of claim 3 further comprising the step of determining a true background value for each reference image pixel.

7. The method of claim 6 further comprising the steps of:
    maintaining a true reference image and a potential reference image;
    generating a coherence measure for each pixel in said true reference image and a coherence measure for each pixel in said potential reference image;
    when the coherence measure of a pixel in the potential reference image exceeds the coherence measure of a pixel in the true reference image, replacing a pixel value of the pixel in the true reference image with a pixel value of the pixel in the potential reference image; and using the true reference image as the reference image.

* * * * *